United States Patent
Bea et al.

(10) Patent No.: US 11,135,675 B2
(45) Date of Patent: Oct. 5, 2021

(54) GAS NOZZLE HAVING A DISPLACEABLE VALVE SLEEVE

(71) Applicant: TRUMPF Werkzeugmaschinen GmbH + Co. KG, Ditzingen (DE)

(72) Inventors: Martin Bea, Kornwestheim (DE); Tim Hesse, Ditzingen (DE)

(73) Assignee: TRUMPF WERKZEUGMASCHINEN GMBH + CO. KG, Ditzingen (DE)

( * ) Notice: Subject to any disclaimer, the term of this patent is extended or adjusted under 35 U.S.C. 154(b) by 0 days.

(21) Appl. No.: 17/186,666

(22) Filed: Feb. 26, 2021

(65) Prior Publication Data

US 2021/0178516 A1 Jun. 17, 2021

Related U.S. Application Data

(63) Continuation of application No. 16/986,516, filed on Aug. 6, 2020, which is a continuation of application (Continued)

(30) Foreign Application Priority Data

May 4, 2015 (DE) .......................... 102015208157.5

(51) Int. Cl.
*B23K 26/14* (2014.01)
*B23K 26/08* (2014.01)
(Continued)

(52) U.S. Cl.
CPC ........ *B23K 26/0876* (2013.01); *B23K 26/048* (2013.01); *B23K 26/1437* (2015.10);
(Continued)

(58) Field of Classification Search
CPC ............ B23K 26/1462; B23K 26/1464; B23K 26/1482; B23K 26/0876
See application file for complete search history.

(56) References Cited

U.S. PATENT DOCUMENTS

| 4,002,877 A | 1/1977 | Banas |
| 4,031,351 A * | 6/1977 | Martin ................... B23K 26/12 |
| | | 219/121.67 |

(Continued)

FOREIGN PATENT DOCUMENTS

| AU | 2013343369 A1 | 6/2015 |
| CN | 1234497 | 11/1999 |

(Continued)

OTHER PUBLICATIONS

Chinese Office Action in Application No. 201680005927.1, dated Mar. 28, 2018, 8 pages (with English translation).

(Continued)

*Primary Examiner* — Geoffrey S Evans
(74) *Attorney, Agent, or Firm* — White & Case LLP

(57) ABSTRACT

This disclosure describes laser machining head gas nozzles that have an exit opening for passage of a laser beam onto a workpiece; an annular gap surrounding the exit opening; and a sleeve disposed and guided displaceably within the annular gap for axial displacement between a rearward and a forward position. The sleeve projects beyond the exit opening at least in the forward position, and the sleeve is tiltably mounted in the annular gap.

30 Claims, 5 Drawing Sheets

Related U.S. Application Data

No. 15/794,642, filed on Oct. 26, 2017, now Pat. No. 10,751,836, which is a continuation of application No. PCT/EP2016/059156, filed on Apr. 25, 2016.

(51) Int. Cl.
  *B23K 26/38* (2014.01)
  *B23K 26/382* (2014.01)
  *B23K 26/04* (2014.01)
  *B23K 26/21* (2014.01)
  *B23K 26/70* (2014.01)

(52) U.S. Cl.
  CPC .......... *B23K 26/1488* (2013.01); *B23K 26/38* (2013.01); *B23K 26/389* (2015.10); *B23K 26/21* (2015.10); *B23K 26/70* (2015.10)

(56) References Cited

U.S. PATENT DOCUMENTS

| | | |
|---|---|---|
| 4,227,582 A | 10/1980 | Price |
| 4,324,972 A | 4/1982 | Furrer et al. |
| 4,458,133 A | 7/1984 | Macken |
| 5,424,508 A | 6/1995 | Swain et al. |
| 5,481,083 A | 1/1996 | Smyth, Jr. |
| 5,609,781 A | 3/1997 | Kaga et al. |
| 5,753,881 A | 5/1998 | Watanabe |
| 5,814,786 A | 9/1998 | Johnson et al. |
| 5,926,967 A | 7/1999 | Johnson et al. |
| 5,932,117 A | 8/1999 | Johnson et al. |
| 5,951,889 A | 9/1999 | Johnson et al. |
| 6,070,781 A | 6/2000 | Johnson et al. |
| 6,118,097 A | 9/2000 | Kaga et al. |
| 6,288,363 B1 | 9/2001 | Kaga et al. |
| 6,797,917 B1 | 9/2004 | Yamaoku et al. |
| 7,838,796 B2 | 11/2010 | Furui |
| 9,604,310 B2 | 3/2017 | Jouanneau et al. |
| 9,610,652 B2 | 4/2017 | Jouanneau et al. |
| 9,616,525 B2 | 4/2017 | Jouanneau et al. |
| 9,844,832 B2 | 12/2017 | Jouanneau et al. |
| 10,076,806 B2 | 9/2018 | Debecker et al. |
| 2006/0113286 A1 | 6/2006 | Furui |
| 2009/0294048 A1 | 12/2009 | Matsuo |
| 2014/0069898 A1* | 3/2014 | Debecker ........... B23K 26/1462 219/121.72 |
| 2015/0048069 A1 | 2/2015 | Debecker et al. |
| 2015/0151378 A1 | 6/2015 | Fujii et al. |
| 2015/0273628 A1 | 10/2015 | Jouanneau et al. |
| 2015/0290742 A1 | 10/2015 | Jouanneau et al. |
| 2015/0336210 A1 | 11/2015 | Jouanneau et al. |
| 2017/0182589 A1* | 6/2017 | Jouanneau ............. B23K 26/14 |
| 2017/0189993 A1 | 7/2017 | Lefebvfre |
| 2018/0354071 A1 | 12/2018 | Debecker et al. |
| 2018/0354073 A1 | 12/2018 | Debecker et al. |

FOREIGN PATENT DOCUMENTS

| | | |
|---|---|---|
| CN | 1450945 | 10/2003 |
| CN | 1234497 | 1/2006 |
| CN | 101497493 | 8/2009 |
| CN | 102513703 | 6/2012 |
| CN | 102554461 | 7/2012 |
| CN | 202291850 | 7/2012 |
| CN | 103962726 | 8/2014 |
| DE | 2352481 | 5/1974 |
| DE | 00134198 | 2/1979 |
| DE | 00134198 Z | 2/1979 |
| DE | 3037981 | 6/1981 |
| DE | 3314959 | 10/1983 |
| DE | 3222394 | 12/1983 |
| DE | 19853735 | 3/2000 |
| DE | 10041276 | 3/2002 |
| DE | 10160785 | 8/2003 |
| DE | 102005010087 | 8/2006 |
| DE | 102012208731 | 11/2013 |
| EP | 0061352 | 12/1984 |
| EP | 1354663 | 10/2003 |
| EP | 1669159 | 6/2006 |
| EP | 1920905 | 5/2008 |
| EP | 2130637 | 12/2009 |
| FR | 2923168 | 5/2009 |
| FR | 2997883 | 5/2014 |
| GB | 1365673 | 9/1974 |
| JP | S57190795 | 11/1982 |
| JP | 61037393 | 2/1986 |
| JP | 62006790 | 1/1987 |
| JP | 62251017 | 10/1987 |
| JP | 6340695 | 2/1988 |
| JP | H01271086 | 10/1989 |
| JP | H-1271086 | 10/1989 |
| JP | H055280 | 1/1993 |
| JP | H05-013683 | 2/1993 |
| JP | 05069174 A * | 3/1993 |
| JP | H06-039571 | 2/1994 |
| JP | 06063784 | 3/1994 |
| JP | 07251287 | 10/1995 |
| JP | H07-251287 | 10/1995 |
| JP | 10216978 | 8/1998 |
| JP | 10286686 | 10/1998 |
| JP | H11277271 | 10/1999 |
| JP | 2004191204 | 7/2004 |
| JP | 2005-118849 | 5/2005 |
| JP | 2012-030249 | 2/2012 |
| JP | 2012-130969 | 7/2012 |
| JP | 2015-534904 | 12/2015 |
| JP | 6066881 | 1/2017 |
| RU | 1787321 | 7/1994 |
| RU | 1787321 C | 7/1994 |
| WO | WO-2012/156608 A1 | 11/2012 |
| WO | WO-2013/150195 A1 | 10/2013 |
| WO | WO-2014/072609 A1 | 5/2014 |
| WO | WO-2014/072611 A1 | 5/2014 |

OTHER PUBLICATIONS

Chinese Office Action in Application No. 201680005927.7, dated Mar. 28, 2018, 8 pages (with English translation).
International Preliminary Report on Patentability and Written Opinion of the International Search Authority for International Application No. PCT/EP2016/059158 dated Nov. 16, 2017 (8 pages).
International Search Report for PCT Application No. PCT/EP2016/059158, dated Jun. 30, 2016, 6 pages.
Korean Office Action in Application No. 10-2017-7025838, dated Dec. 19, 2017, 14 pages (with English translation).
Korean Office Action in Application No. 10-2017-7025838, dated Jan. 2, 2018, 14 pages (with English translation).
Chinese Office Action in Application No. 201680005972.7, dated Mar. 28, 2018, 8 pages (with English Translation).
Chinese Office Action in Application No. 201680005927.1, dated Mar. 28, 2018, 6 pages.
Chinese Office Action in Application No. 201680005972.7, dated Mar. 28, 2018, 6 pages.
International Preliminary Report on Patentability and Written Opinion of the International Search Authority for International Application No. PCT/EP2016/059158 dated Nov. 16, 2017 (13 pages) (with English translation).
International Preliminary Report on Patentability and Written Opinion of the International Search Authority for International Application No. PCT/EP2016/059156, dated Nov. 17, 2017, 13 pages (with English translation).
International Search Report for PCT Application No. PCT/EP2016/059156, dated Jun. 30, 2016, 15 pages (with English translation).
International Search Report for PCT Application No. PCT/EP2016/059158, dated Jun. 30, 2016, 7 pages (with English Translation).
Korean Office Action in Application No. 10-2017-7025838, dated Dec. 19, 2017, 12 pages (with English translation).
English Translation of Korean Office Action in Application No. 10-2017-7025838, dated Apr. 4, 2018, 3 pages.

* cited by examiner

GAS NOZZLE HAVING A DISPLACEABLE VALVE SLEEVE

CROSS-REFERENCE TO RELATED APPLICATIONS

This application is a continuation of U.S. patent application Ser. No. 16/986,516, filed on Aug. 6, 2020, which is a continuation of U.S. patent application Ser. No. 15/794,642, filed on Oct. 26, 2017, now U.S. Pat. No. 10,751,836, which is a continuation of International Patent Application No. PCT/EP2016/059156, filed on Apr. 25, 2016, which claims the benefit of and priority to German Patent Application No. 102015208157.5, filed on May 4, 2015. The aforementioned, earlier-filed applications are hereby incorporated by reference herein in their entireties.

TECHNICAL FIELD

The invention relates to a gas nozzle for a laser machining head.

BACKGROUND

Various gas nozzles, which have different external or internal contours, differently shaped nozzle openings, and different nozzle diameters, are required for machining (for example, cutting or welding) different materials (e.g., construction steel, stainless steel, aluminum, etc.) of different material thicknesses with the aid of a laser beam.

A gas nozzle having an inner nozzle through which a laser beam and a cutting gas are directed onto a workpiece is known from WO 2014/072609 A1. A sleeve is guided so as to be axially displaceable in an annular gap that surrounds an inner nozzle of the gas nozzle, wherein the sleeve is pretensioned to a rearward end position thereof by a spring. The rear end side of the sleeve in the annular gap delimits an annular space that is connected to a nozzle bore of the inner nozzle by way of connection openings. The higher the cutting gas pressure, the further the sleeve is advanced forward, counter to the restoring force of the spring. The sleeve is guided in the gas nozzle body both on the external side on a cap as well as on the internal side on a tubular element so as be axially displaceable. The sleeve on the front end face of the sleeve on the external side can have a run-up slant to be able to slide without damage across minor steps in the workpiece surface, such as can arise by the tilting of workpiece parts that have been cut off, for example.

SUMMARY

The present disclosure refines gas nozzles in such a manner that the end face of the sleeve bears in a fully circumferential manner on the workpiece surface, even on workpiece parts having a non-planar workpiece surface and/or are inclined. These new gas nozzles improve the effect of a process or inert gas in laser machining and reduce gas consumption in a reliable manner.

In some embodiments, the sleeve is mounted so as to be tiltable in the annular gap. For example, in some embodiments, the sleeve is mounted in the annular gap in a "floating" manner to have a lateral clearance when the sleeve is mounted, and to be tiltable, for example by ±5°, within the annular gap. In this way, the gas nozzle is able to react to unevenness of the workpiece surface by tilting without being mechanically damaged and without losing a form-fitting contact with the workpiece surface. The sleeve can advantageously have an externally encircling pointed or spherical centering bead, which is guided to be displaceable and mounted to be tiltable on the external wall of the annular gap. Alternatively or additionally, the external wall of the annular gap can taper, in particular in a conical manner, in the forward direction, and/or the sleeve external side can taper, in particular in a conical manner, in the reverse direction, so as to enable tilting of the sleeve within the annular gap.

To improve the sliding of the sleeve across a non-planar workpiece surface even further, the front end face of the valve sleeve on the internal side and/or the external side can have a run-up slant, for example in the form of a 45° chamfer.

The exit opening can be formed by a nozzle exit opening of an inner nozzle for directing a core flow onto the workpiece, and/or the annular gap is formed in an outer nozzle for directing an annular gas flow onto the workpiece. In the latter case, the sleeve in the two positions opens the nozzle cross-sectional area of the outer nozzle to a different degree, wherein the sleeve in the one position thereof closes the outer nozzle completely or almost completely, and in the other position thereof opens the outer nozzle.

In some embodiments, the inner nozzle and the outer nozzle are formed in a nozzle body and can either have mutually separate gas connectors or, if a nozzle bore of the inner nozzle and the annular gap of the outer nozzle are interconnected by way of at least one connection bore of the nozzle body or the inner nozzle, can have a common gas connector. In the latter case, the nozzle bore of the inner nozzle is advantageously connected to the gas connector, and the annular gap is connected to the nozzle bore by way of the connection bore(s). By displacing the sleeve within the annular gap, the properties of the gas nozzle in terms of flow mechanics can be varied from the characteristic of a single-bore nozzle (single-duct nozzle), in which the gas flows from only the inner nozzle, to that of a bypass flow nozzle (multi-duct nozzle), in which the gas flows from both the inner nozzle as well as from the outer nozzle.

The single-bore nozzle (in cutting) is advantageous for the machining of thin sheets and for piercing, and the bypass flow nozzle is advantageous for machining thick sheets. Workpieces of dissimilar thickness can thus be machined using the gas nozzle, and dissimilar machining methods (for example cutting, marking, welding) can also be implemented. The flexibility of the gas nozzle reduces the previously numerous necessary gas nozzle variants needed by the user as well the spare parts inventory. Furthermore, unproductive downtime of the machine during a nozzle change can be minimized.

In the rearward position of the sleeve, an annular space connected to the environment by way of a guide gap between the nozzle body and the sleeve remains between the rear end face of the sleeve and the nozzle body. At least one connection opening is formed as an opening that extends into the annular space. Due to the annular space that is provided in each sleeve position and of the opening(s) communicating therewith, it is possible for the sleeve to be suctioned from an advanced position to the rearward end position of the sleeve by way of a targeted selection of the gas pressure.

In other embodiments, the nozzle bore of the inner nozzle and the annular gap of the outer nozzle are not interconnected by openings. An annular space that is provided between the rear end face of the sleeve and the nozzle body is connected to the environment, e.g. by way of a guide gap between the nozzle body and the sleeve. Due to the Venturi effect of the cutting gas that flows out of the inner nozzle, air (oxygen) is suctioned from the environment, and the air within the sleeve mixes with the nitrogen cutting gas jet.

The contact pressure of the sleeve on the workpiece surface can advantageously be adjusted in a targeted manner by the constructive design of the sleeve. If the surface part of the sleeve on which the cutting gas pressure acts in a forward direction is larger than the surface part of the sleeve on which the cutting gas pressure acts in a reverse direction, in particular in the case of a sleeve that has landed on the workpiece surface, the cutting gas pressure causes a contact-pressure force of the sleeve on the workpiece surface.

Alternatively, the surface part of the sleeve on which the cutting gas pressure acts in the forward direction can be equal to or somewhat smaller than the surface part of the sleeve on which the cutting gas pressure acts in the reverse direction (in the case of a sleeve that has landed on the workpiece surface). In this case, independent of the absolute level of gas pressure, the lifting force and the contact-pressure force that act on the sleeve by way of the cutting gas pressure are at equilibrium, or a small lifting force is established. The sleeve can slide across a planar workpiece surface with minimal friction, but nevertheless constantly bearing in planar manner on the workpiece surface.

Alternatively, a minimum gap is established between the end face of the sleeve and the workpiece surface such that the sleeve hovers above the workpiece surface. The latter design embodiment of the sleeve is particularly advantageous for scratch-free machining by cutting.

Particularly advantageously, the internal wall of the annular gap is formed by the conical external side of the inner nozzle. Further advantageously, the sleeve is guided so as to be displaceable on the external wall of the annular gap.

In some embodiments, the sleeve in one of the (end) positions thereof closes the outer nozzle, and a valve seat on which the sleeve in that position thereof that closes the outer nozzle bears is disposed in the annular gap.

In some instances, the valve seat is closed in the rearward (end) position of the sleeve, and is open in the forward (end) position of the sleeve. The valve seat can be formed by a conical wall portion or by an annular shoulder of the annular gap, for example. The valve seat is disposed on the internal wall of the annular gap, but in the case of the annular shoulder can also be formed on the base of the annular gap. The conical wall portion tapers in the forward direction of the sleeve.

In other embodiments, the valve seat is closed in the forward (end) position of the sleeve, and is open in the rearward (end) position of the sleeve. The valve seat can be formed by a conical wall portion or by an annular shoulder of the annular gap, for example, wherein the sleeve has a sealing face that in the reverse direction engages behind the valve seat. The conical wall portion tapers in the reverse direction of the sleeve.

A sealing face of the sleeve that interacts with the valve seat can be molded to the sleeve in an integral manner or be formed by a separate annular seal. In the latter case, the sleeve and the annular seal can be made from different materials; for example, a sleeve made of ceramic and an annular seal made of metal. The production costs for the sleeve are reduced and the annular seal has a more precise sealing face than an integral sleeve made from ceramics.

In certain embodiments, the sleeve is made from a ceramic material (aluminum oxide, for example) since ceramics in terms of high-frequency technology are sufficiently neutral or electrically non-conducting, respectively. The cutting gas nozzles described herein can be treated like a common bypass flow nozzle (a nozzle without an integrated sleeve) by the capacitive spacing sensor system of the laser machining head. Furthermore, the high melting point and the high resistance to abrasion of ceramics guarantee a sufficiently long service life of the sleeve. However, instead of ceramic, the sleeve can also be formed from a comparably temperature-resistant and electrically non-conducting material or from a plastic material that is temperature resistant up to at least 100° C. In the latter case, the sliding properties, the strength, and a temperature resistance (continuous operating temperature) up to at least 100° C. are important. The coefficient of friction in the movement across dry steel should be <0.3. Moreover, the relative dielectric constant at $10^6$ Hz should be below 3. These requirements are met by TEFLON® (polytetrafluoroethylene), for example.

The front end face of the sleeve typically has at least one groove (e.g., a plurality of grooves) that runs obliquely to the radial direction, or the sleeve wall can have at least one bore (e.g., a plurality of bores), that runs obliquely to the radial direction. Due to the oblique or helical alignment, respectively, of the grooves and bores, the momentum of the outflowing cutting gas exerts a torque and rotates the sleeve. Alternatively, the external side of the sleeve wall can also have at least one groove (e.g., a plurality of grooves), that runs obliquely to the axial direction such that the sleeve is set in rotation by the air that flows axially along the outside of the sleeve or by the process or inert gas that flows along the outside of the sleeve. Due to the rotating sleeve, contaminants on the workpiece surface can be removed, for example. The gas pressure within the processing zone that is located below the sleeve can be modulated in a targeted manner by way of at least one bore or groove (e.g., a plurality of bores or grooves) in the sleeve wall.

Figure 1A:
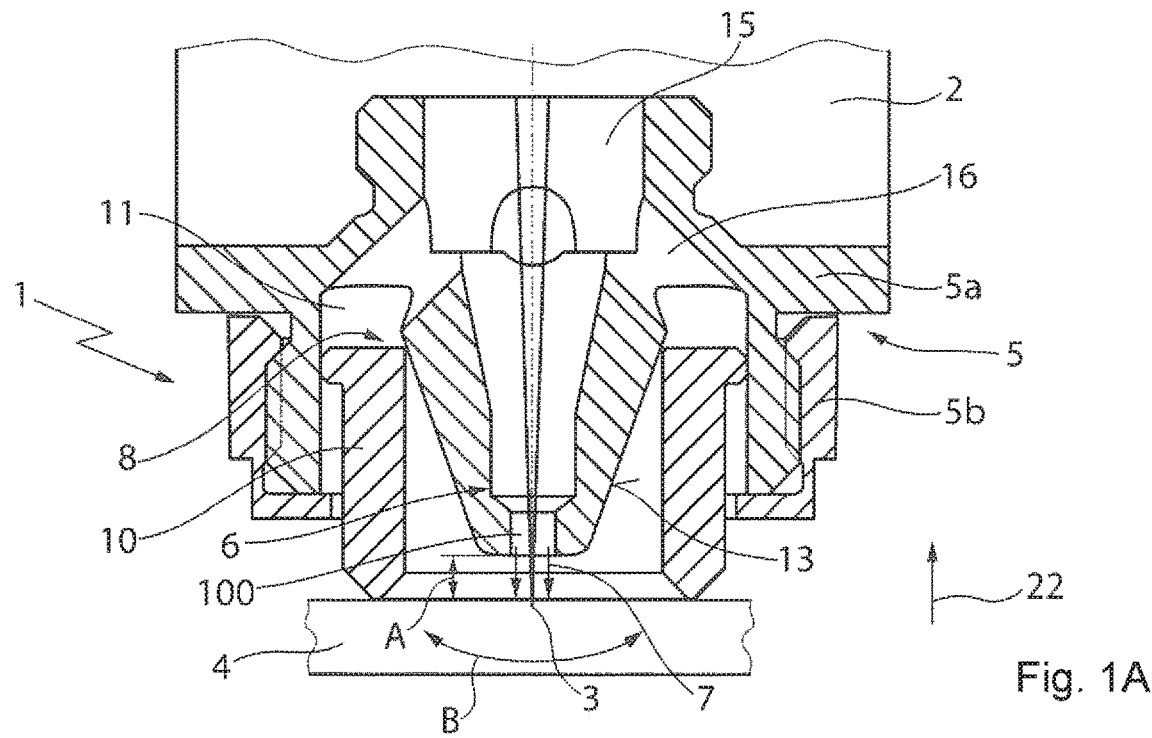
FIG. 1A shows a first cutting gas nozzle having an outer nozzle in a closed end position.

Identical reference signs are used for the same or functionally equivalent components in the following description of the drawing.

DETAILED DESCRIPTION

The cutting gas nozzles 1, 1' shown in FIGS. 1A, 1B, 2A, and 2B are disposed on a laser machining head 2 and direct a cutting gas onto a workpiece (for example a metal sheet) 4 machined by a laser beam 3. Such cutting gas nozzles 1, 1' can be employed on a laser machine tool such as is disclosed in DE 10 2013 210 844 B3, for example.

The cutting gas nozzles 1, 1' in each case include a nozzle body 5 having an exit opening 100 for the passage of the laser beam 3 onto the workpiece 4, having an inner nozzle 6 for forming a core flow 7, and an outer nozzle 8, surrounding the inner nozzle 6, for forming an annular flow 9. A valve sleeve 10 projects beyond the inner nozzle 6 and is guided in the annular gap 11 of the outer nozzle 8 so as to be axially displaceable between two positions. The valve sleeve 10 that can be designed as a ceramic sleeve closes the nozzle cross-sectional area 25 of the outer nozzle 8 in the one position, and opens (or widens) the cross-sectional area 25 of the outer nozzle 8 in the other position. The valve sleeve 10 projects in at least one of the two positions beyond the inner nozzle 6 and is guided so as to be displaceable on the external wall 12 of the annular gap 11. A valve seat 14 that closes the outer nozzle 8 when the valve sleeve 10 in the end position is on the internal wall 13 of the annular gap 11, the internal wall 13 being formed by the external side of the inner nozzle 6. The inner nozzle 6 is connected to a gas supply (not shown) by way of the central nozzle bore 15. The annular gap 11 is connected to the nozzle bore 15 by way of one or a plurality of connection openings 16. The laser beam 3 is directed through the nozzle exit opening 100 of the inner nozzle 6 onto the workpiece 4.

The valve sleeve 10 has an externally encircling centering bead 17 with a tight tolerance, the centering bead 17 being guided so as to be displaceable on the external wall 12 of the annular gap 11 in a largely sealed manner. A mechanical clearance between the external wall 12 of the annular gap 11 and the outwardly pointed or spherical centering bead 17 enables tilting of the valve sleeve 10 in the sense of the double arrow B within the annular gap 11 by about ±5°. In this way, unevennesses in the workpiece surface can be accounted for in the movement of the valve sleeve 10 on the workpiece 4. To slide without damage across minor steps in the workpiece surface (for example, as can arise by the tilting of workpiece parts that have been cut off), the front end face of the valve sleeve 10 on the internal side and the external side has in each case one encircling run-up slant 18a, 18b in the form of a chamfer having a chamfer angle of 45° (e.g., between 30° and 60°).

Figure 1B:
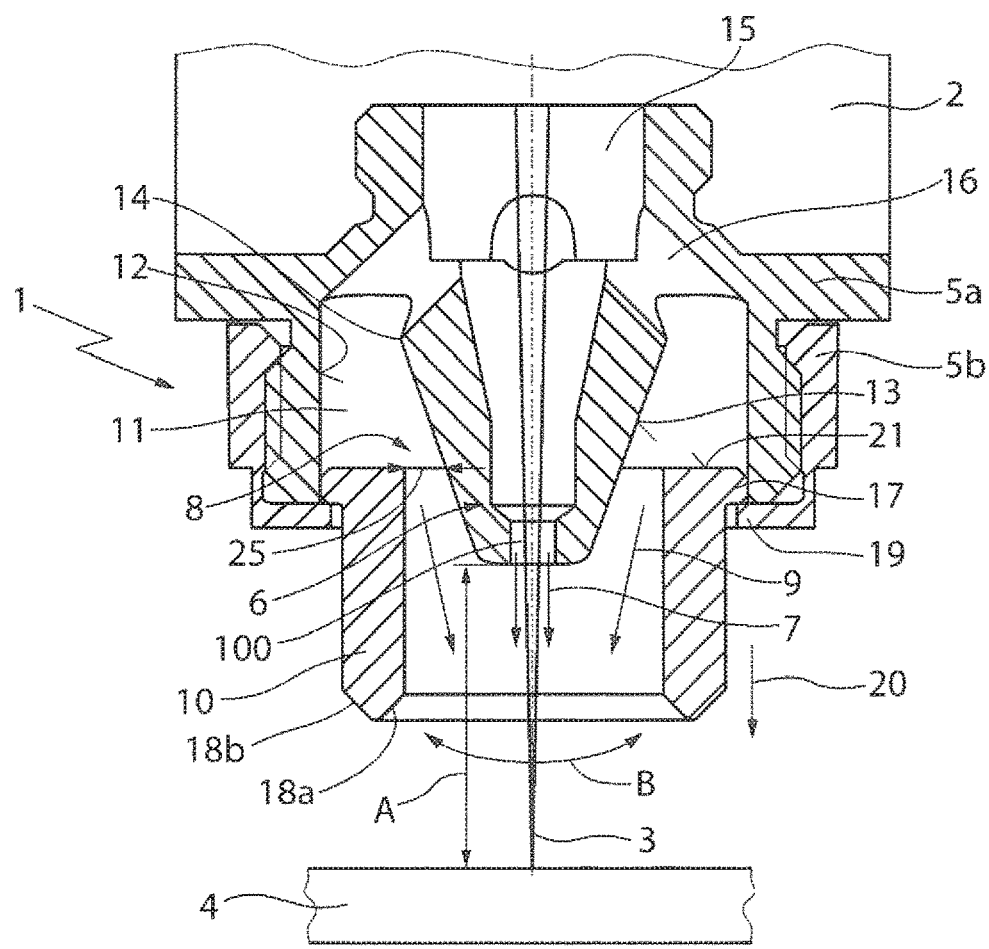
FIG. 1B shows a first cutting gas nozzle having an outer nozzle in an open end position.

In the case of the cutting gas nozzle 1 shown in FIGS. 1A and 1B, the nozzle body 5 comprises a main body 5a (for example made from copper) that is screw-fitted into the laser machining head 2 and that has the inner nozzle 6, that is optionally screw-fitted to the main body 5a or is integral to the latter. An outer nozzle 8, and a securing nut 5b (for example made from copper) is screw-fitted externally onto the main body 5a and has a securing rim 19 that projects radially inward into the annular gap 11. The securing rim 19 holds the valve sleeve 10 captive in the annular gap 11 and forms an end stop on which the valve sleeve 10 in the forward end position thereof bears by way of the centering bead 17. The valve seat 14 is formed by the internal wall 13 of the annular gap 11, the internal wall 13 converging in a conical manner in the forward direction 20 of the valve sleeve 10, the valve seat 14 conjointly with the valve sleeve 10 forming an annular gap valve.

In the rearward end position of the valve sleeve 10 (spacing A of the inner nozzle 6 from the workpiece 4 can be approximately 0 to 1 mm) as shown in FIG. 1A, the valve sleeve 10 sits on the workpiece 4 and by way of the internal edge of the sleeve bore of the valve sleeve 10 bears in a sealing manner on the valve seat 14, so that the annular gap valve and thus the nozzle cross-sectional area 25 of the outer nozzle 8 are closed. The cutting gas that flows into the cutting gas nozzle 1 from the laser machining head 2 can flow out as a core flow 7 only through the central nozzle exit opening 100 of the inner nozzle 6. This single-bore nozzle (single-duct nozzle) is desirable in the machining of a thin sheet, for example.

When the valve sleeve 10 is advanced from the rearward end position thereof toward the front, the valve sleeve 10 is lifted from the valve seat 14 and the annular gap valve opens. As the valve sleeve 10 advances, an increasingly wider gap, that is to say an increasingly wider nozzle opening 25, is created between the valve sleeve 10 and the internal wall 13 such that an increasing proportion of the cutting gas no longer flows out through the nozzle exit opening 100 of the inner nozzle 6 but by way of the connection openings 16 into the annular gap 11 and from there as an annular flow 9 through the outer nozzle 8. This bypass flow nozzle (multi-duct nozzle) in which the cutting gas flows out both from the inner nozzle 6 as well as from the outer nozzle 8 is desirable when cutting thick workpieces. The valve sleeve 10 is shown in its forward end position in FIG. 1B, wherein the spacing A of the inner nozzle 6 from the workpiece 4 is larger by at least the displacement path of the valve sleeve 10 between the two end positions thereof than that in the rearward end position.

Because of the centering bead 17, the rear end face 21 of the valve sleeve 10 is significantly larger than the front end face formed from the part-face 18a, such that the pressure difference between the interior of the nozzle and the environment causes the valve sleeve 10 to advance in the forward direction 20 and, in the case of a valve sleeve 10 that has already landed on the workpiece surface, a contact-pressure force of the valve sleeve 10 on the workpiece surface that is proportional to the cutting gas pressure. Any lifting of the valve sleeve 10 from the workpiece surface is positively prevented due to this pneumatic spring approach of the valve sleeve 10 that is proportional to pressure. The reversing of the valve sleeve 10 in the reverse direction 22 is performed by lowering the cutting gas nozzle 1 at a variable spacing from the workpiece 4 such that the valve sleeve 10 lands on the workpiece surface and is then reversed in the reverse direction 22.

Figure 2A:
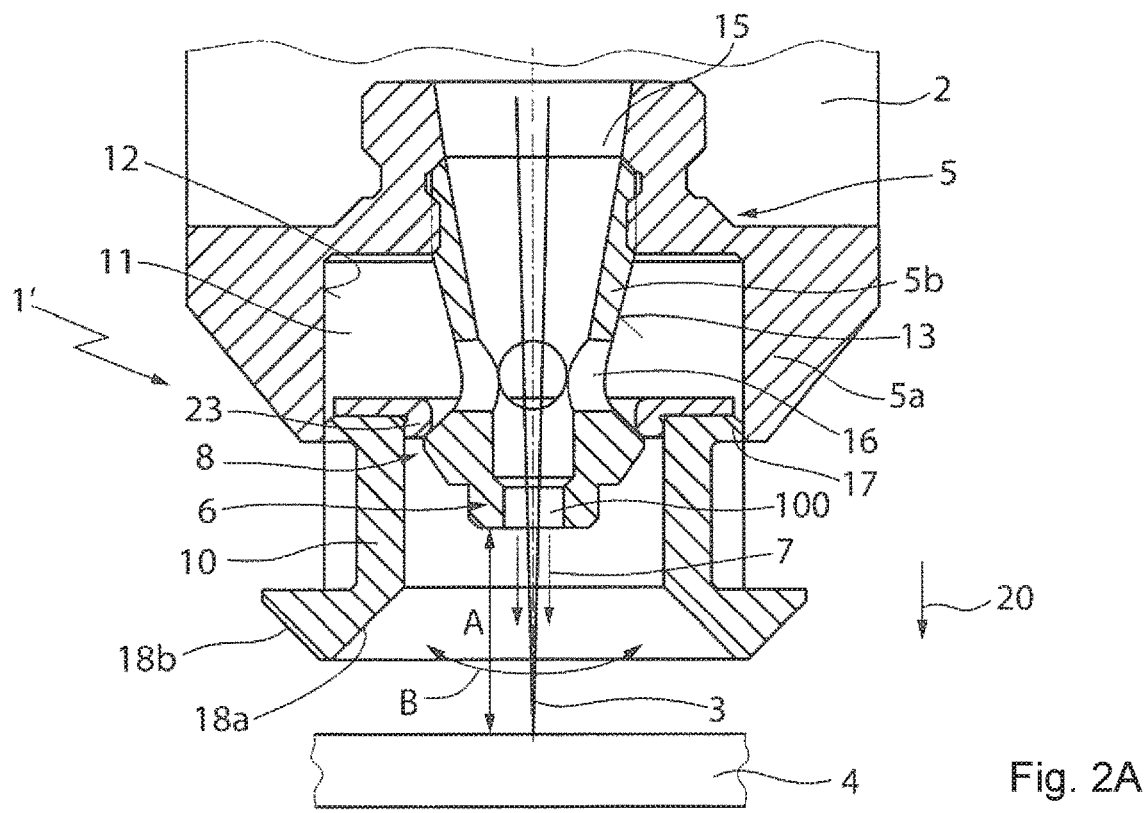
FIG. 2A shows a second cutting gas nozzle having an outer nozzle in a closed end position.
Figure 2B:
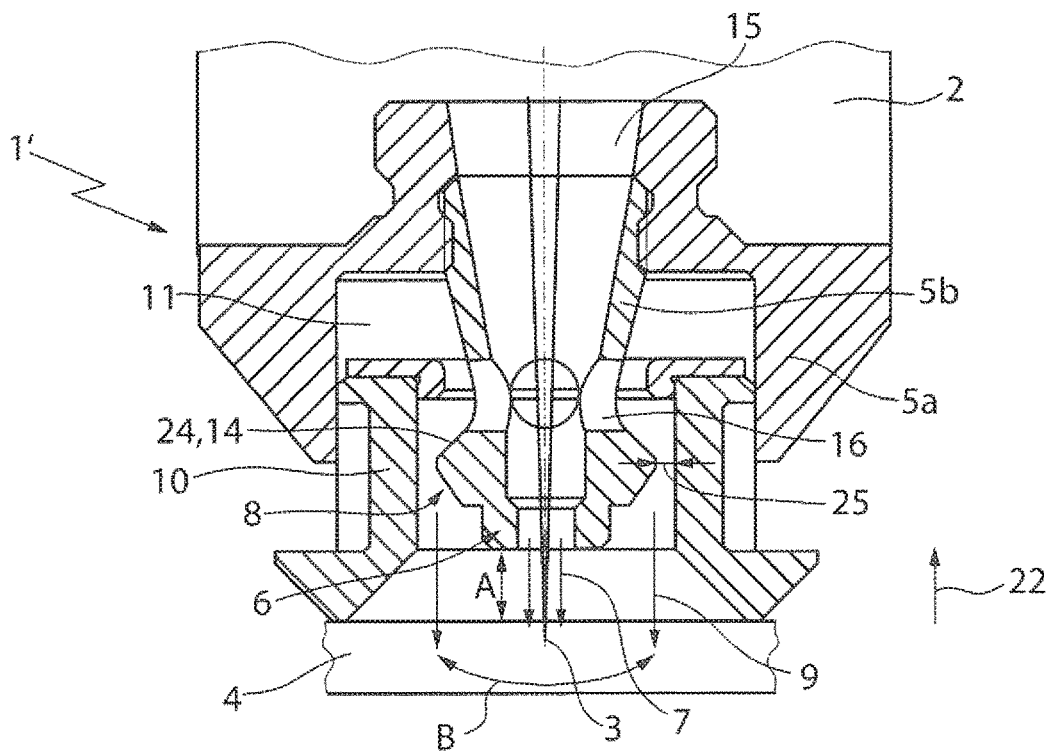
FIG. 2B shows a second cutting gas nozzle having an outer nozzle in an open position.

In the cutting gas nozzle 1' shown in FIGS. 2A, 2B, the nozzle body 5 includes an external nozzle body 5a (for example from copper) that is screw-fittable into the laser machining head 2 and forms the external wall 12 of the annular gap 11. The nozzle body also has an inner nozzle body 5b (for example from copper) that is screw-fitted, press-fitted, or adhesively bonded into the external nozzle body 5a and includes the inner nozzle 6, the external side of the inner nozzle body 5b forming the internal wall 13 of the annular gap 11. The valve seat 14 is formed by a front wall portion 24 of the internal wall 13 that converges conically in the reverse direction 22 and interacts with an internal contour of the valve sleeve 10 that is shaped as a shoulder, or with an annular seal 23 which is fastened to the rear end side of the valve sleeve 10 and engages behind the valve seat 14 in the forward direction 20. The annular seal 23 or the shoulder of the valve sleeve 10, respectively, holds the valve sleeve 10 so as to be captive in the annular gap 11. The valve seat 14 conjointly with the valve sleeve 10 forms an annular gap valve.

In the forward end position of the valve sleeve 10 shown in FIG. 2A, the valve sleeve 10 is spaced apart from the workpiece 4 and by way of the annular seal 23 bears on the valve seat 14 in a sealing manner, so that the annular gap valve and thus the nozzle cross-sectional area 25 of the outer nozzle 8 are closed. The cutting gas that flows into the cutting gas nozzle 1' from the laser machining head 2 can flow out as a core flow 7 only through the central nozzle exit opening 100 of the inner nozzle 6. This single-bore nozzle (single-duct nozzle) is desirable in the piercing of the workpiece 4 by the laser beam 3 or in the machining of thin sheet, when the laser machining head 2 and thus the inner nozzle 6 are spaced apart from the workpiece surface at a large distance.

When the valve sleeve 10 is reversed from the forward end position thereof by lowering the machining head 2 in the direction of the workpiece surface 4 in the reverse direction 22 to the position shown in FIG. 2B, the valve sleeve 10 is lifted from the valve seat 14 and the annular gap valve opens such that the cutting gas by way of the connection openings 16 flows out also into the annular gap 11 and from there as an annular flow 9 through the nozzle cross-sectional area 25 of the outer nozzle 8. This bypass flow nozzle (multi-duct nozzle) in which the cutting gas flows out of both the nozzle exit opening 100 of the inner nozzle 6 as well as from the outer nozzle 8 is desirable for cutting thick workpieces. The valve sleeve 10 in FIG. 2B is shown bearing on the workpiece 4, wherein the spacing A of the inner nozzle 6 from the workpiece 4 is smaller by the displacement path of the valve sleeve 10 than in the forward end position of the nozzle when landed.

The valve sleeve 10 in the example shown is constructed such that in operation, independently of the absolute level of gas pressure, the lifting force and the contact forces that act on the valve sleeve 10 by way of the cutting gas pressure are just at an equilibrium, such that the valve sleeve 10 slides across the (planar) workpiece surface largely without friction but nevertheless so as to be bear thereon in a constantly planar manner. This is achieved in that that surface part of the valve sleeve 10 on which the cutting gas pressure acts in the forward direction 20 is equal in size to that surface part of the valve sleeve 10 on which the cutting gas pressure acts in the reverse direction 22. In the example shown, the rear end face that is formed by the valve sleeve 10 and the annular seal 23 is of equal size as the front end face (in the projection) that is formed by the internal run-up ramp 18a, the front end face being impinged with cutting gas pressure in the case of the valve sleeve 10 having landed on the workpiece 4. Advancing the valve sleeve 10 in the forward direction 20 in the case of a valve sleeve 10 that has not landed on the workpiece 4 is performed by the cutting gas pressure. Reversing the valve sleeve 10 in the reverse direction 22 is performed by lowering the cutting gas nozzle 1 at a variable spacing from the workpiece 4, so that the valve sleeve 10 lands on the workpiece surface and is reversed in the reverse direction 22. A defined hovering state of the valve sleeve 10 above the workpiece 4 can be achieved independently from the current gas pressure by modifying these area ratios in a targeted manner, so as to enable scratch-free machining by cutting, for example.

Following piercing, deposits of slag and solidified metal droplets adhere to the workpiece surface. This contamination of the workpiece surface renders it unsuitable for landing the valve sleeve 10 in a flush manner on the workpiece 4, but still must be traversed to be overcome on the path of the laser beam 3 from the piercing hole at the start of the actual cutting contour. The numerically controlled switching of the nozzle characteristic is beneficial in this transitional region (referred to as "precut") between the piercing position and the actual cutting contour. In the region of the precut, the nozzle characteristic of a single-bore nozzle (single-duct nozzle) is more favorable for a stable cutting process, while switching to the bypass flow (multi-duct) characteristic can take place upon reaching the actual component contour, should this be more favorable for cutting thick workpieces.

The cutting gas nozzle 1' when piercing at a large spacing has the same properties as those of a classic single-bore nozzle (single-duct nozzle). Therefore, no additional data detection for piercing process parameters is required. The gas jet is compact when piercing, as the gas jet can exit only through the central opening 100 of the inner nozzle 6, thus the cutting gas nozzle 1' is protected against contamination by splashes or smoke. The trajectory and the cooling behavior of metal droplets that are ejected out of the piercing hole are influenced in the best possible manner such that piercing that is as splash-free as possible is achieved.

The almost gas-tight encapsulation of the region between the cutting gas nozzle 1, 1' and the workpiece surface in the case of a landed cutting gas nozzle 1, 1' has several advantages, including minimizing the quantity of gas that does not penetrate the cutting gap (utilized process gas), but flows out of the processing zone horizontally across the sheet surface (non-utilized process gas). Due to this minimization, the maximum cutting gas pressure provided by the machine, and the required maximum cutting gas flow rate, are also minimized, as is the noise emission generated by the cutting gas nozzle 1, 1'. Cutting of even larger sheet thicknesses is possible due to the improved coupling of the cutting gas into the cutting gap at available maximum gas pressures provided by the machine. Any detrimental mixing of the cutting gas (ultrapure oxygen, for example) with ambient air that is also suctioned into the cutting gap is prevented.

The "floating" tilting mounting of the valve sleeve 10 in the nozzle body 5 in the ongoing cutting operation permits the numerically controlled variation of the spacing A between the nozzle and the sheet, and on account thereof the targeted modification of the flow distribution within the valve sleeve 10 and the flexible employment of the cutting gas nozzle 1, 1' both as a classic single-bore nozzle (single-duct nozzle) as well as a consumption-minimized bypass flow nozzle (multi-duct nozzle). Also, non-planar workpiece surfaces are automatically compensated for without modifying the cutting gas dynamics and thus also without modifying the cutting result.

The valve seat 14, as opposed to the shown conical variant, can also be a planar annular shoulder, in particular on the base of the annular gap 11.

Figure 3A:
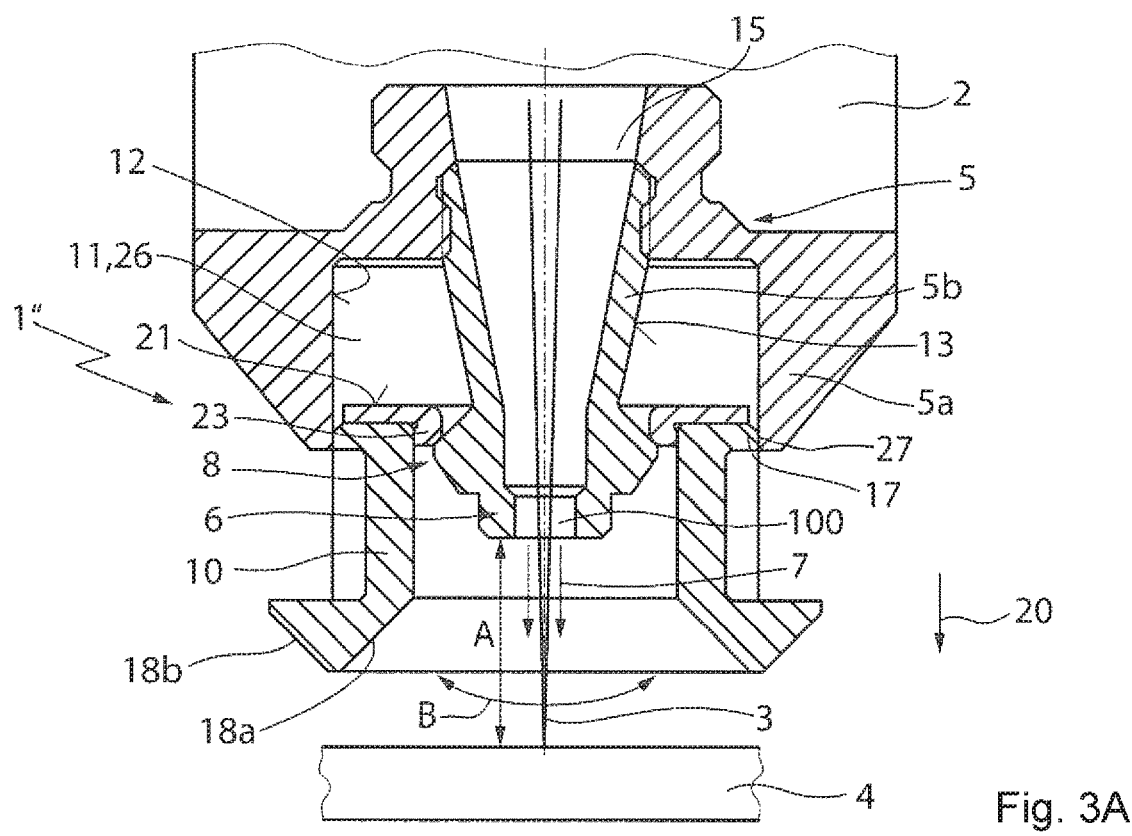
FIG. 3A shows a third cutting gas nozzle having an outer nozzle in a closed end position.
Figure 3B:
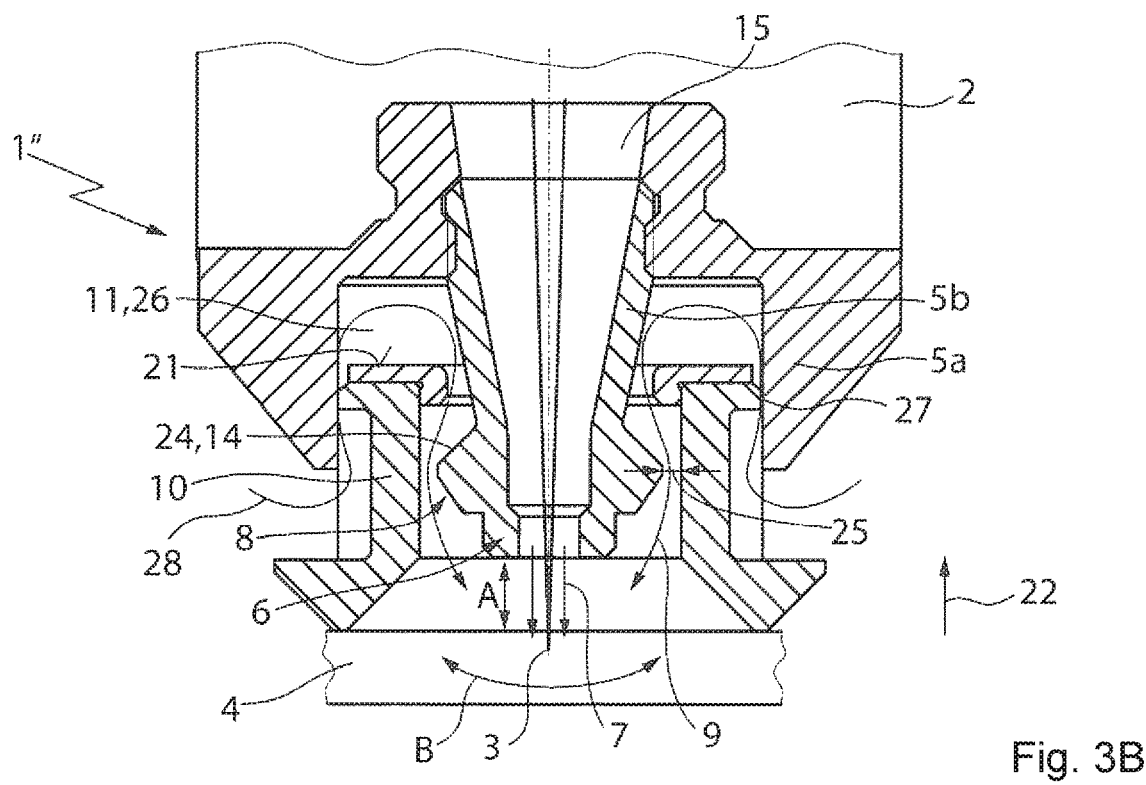
FIG. 3B shows a third cutting gas nozzle having an outer nozzle in an open position.

The cutting gas nozzle 1" shown in FIGS. 3A and 3Bb differs from the cutting gas nozzle 1' of FIGS. 2A and 2B in that the nozzle bore 15 of the inner nozzle 6 and the annular gap 11 of the outer nozzle 8 are not interconnected and thus there are no connection bores. An annular space 26 is provided between the rear end face 21 of the valve sleeve 10 and the nozzle body 5 is connected to the environment by way of a guide gap 27 that is provided between the nozzle body 5 and the valve sleeve 10. Thus, the sealing of the external diameter of the valve sleeve 10, or of the centering bead 17 thereof, respectively, in relation to the ambient atmosphere as desired in the case of the cutting gas nozzles 1, 1' is dispensed with in a targeted manner.

The ratio between the rear and the front end faces of the sleeve is chosen such that, independently of the cutting gas pressure used, the gas pressure forces that in the cutting operation act on the valve sleeve 10 cause a defined hovering state of the valve sleeve 10 such that a sufficiently high flow of lost gas escapes from the valve sleeve 10 through the gap between the front end face of the sleeve and the workpiece surface, the gap being adjustable in a defined and reproducible manner.

Alternatively, a sufficiently high flow of lost gas can be achieved by the targeted incorporation of gas outflow ducts into the end face of the sleeve, or else of gas outflow bores into the cylindrical part of the sleeve.

If the cutting gas nozzle 1", proceeding from the closed valve position thereof that is shown in FIG. 3A, is operated at an increasingly reduced spacing A of the inner nozzle to the workpiece 4, the valve sleeve 10 is lifted from the valve seat 14 and the annular gap valve is increasingly opened (FIG. 3B). Due to the Venturi effect of the cutting gas that flows out of the internal valve 6, (increasingly more) air (and thus oxygen) 28 is suctioned by way of the guide gap 27 as an annular flow 9 from the environment, the annular flow within the valve sleeve 10 mixing with the nitrogen cutting gas jet. In this way, depending on the spacing A from the workpiece 4, a proportion of foreign gas in the nitrogen flow that is utilized as the cutting gas can be adjusted in a targeted manner by way of oxygen from the environment. The cutting gas nozzle 1" thus acts as an adjustable gas-mixing nozzle. Adapting the resulting proportion of oxygen in the cutting gas to the requirements of the current cutting process can be performed in a reproducible and adjustable manner (depending on, for example, the laser output, the sheet thickness, the rolling skin properties) by way of the correct choice of the spacing A from the workpiece 4.

With the aid of such an adjustable gas-mixing nozzle the process efficiency and process stability, for example in the cutting of aluminum by $CO_2$ laser radiation, can be increased by controlled admixing of approximately 0.5 to 2% oxygen from the environment to the ultrapure nitrogen cutting gas jet. Due to the presence of the minor percentage of oxygen, an increase in the absorption coefficient and a reduction in the melt viscosity are achieved in the cutting process.

If admixing of ambient air is not to be performed, the spacing A of the inner nozzle from the workpiece 4 is to be enlarged to the extent that the valve sleeve 10 lands on the conical valve seat 14 and the annular gap 11 is thus closed (FIG. 3A). In this way, coupling-in of the ultrapure cutting gas jet into the cutting gap is enabled at a minimal contamination by the ambient atmosphere. This is advantageous for cutting oxide-free components, for example.

In a further variant (not shown), the gas nozzle can alternatively be embodied such that the nozzle bore 15 of the inner nozzle 6 and the annular gap 11 of the outer nozzle 8 are not interconnected, thus that no connection bores are provided, and in that the annular space 26 that is provided between the rear end face 21 of the valve sleeve 10 and the nozzle body 5 is not connected to the environment. The gas nozzle in this variant always acts as a single-duct nozzle. A variation of the flow conditions is not possible by way of such a gas nozzle, but coupling-in of the cutting gas into the cutting gap, or the effect of an inert gas in welding, is improved, respectively.

Figure 4A:
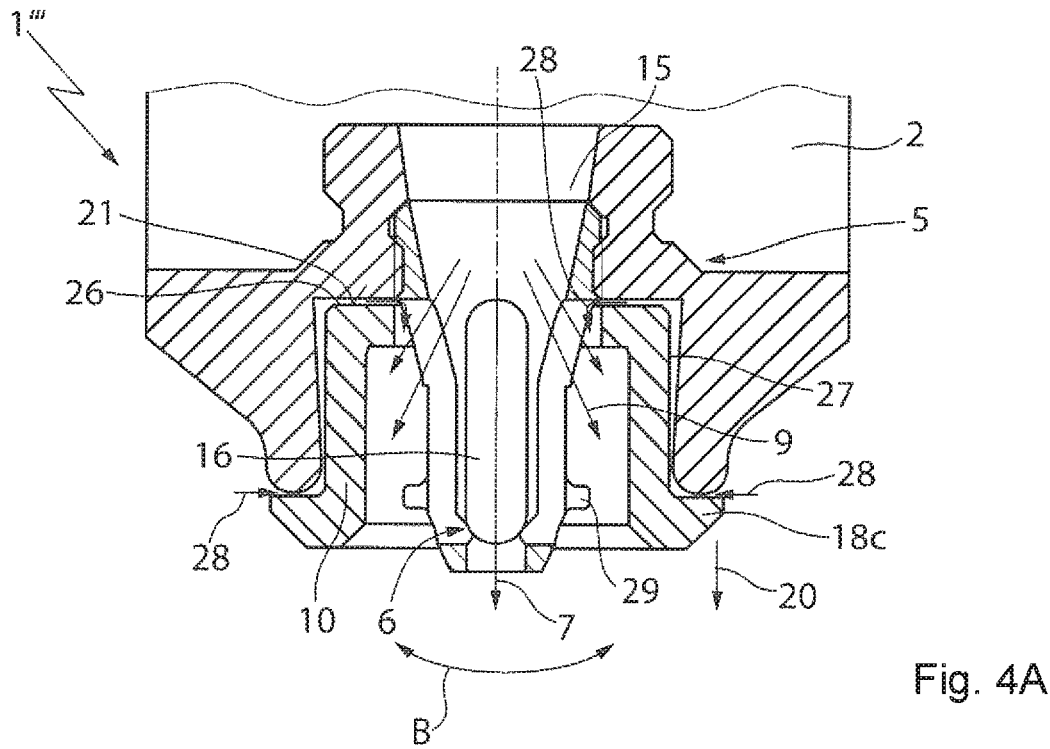
FIG. 4A shows a fourth cutting gas nozzle having an outer nozzle in one end position.
Figure 4B:
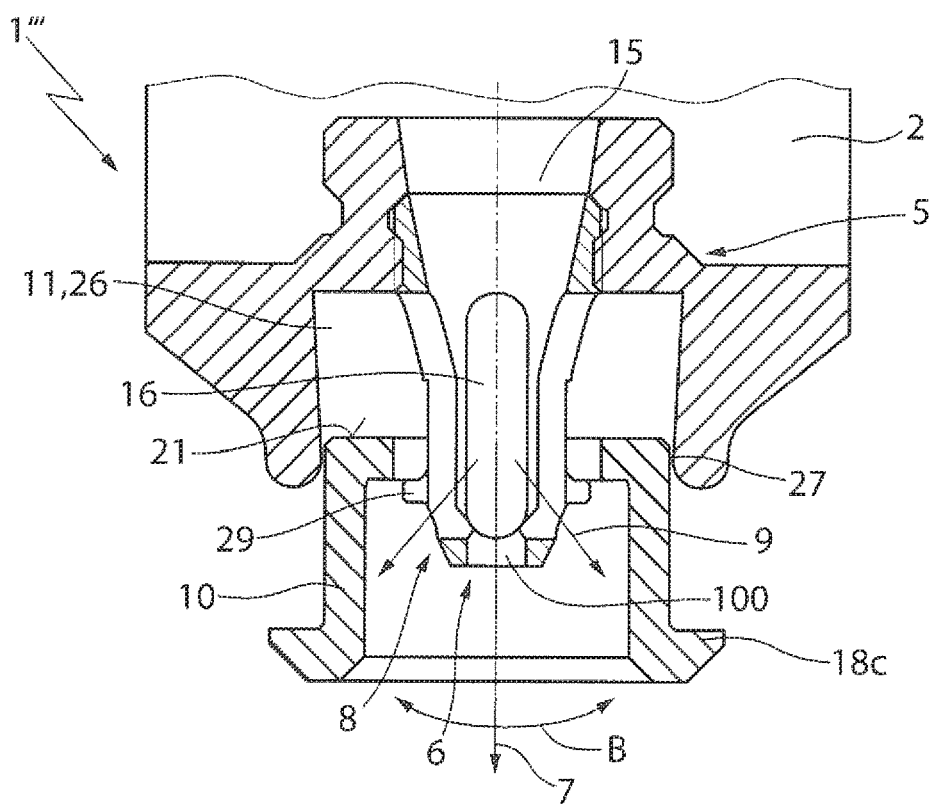
FIG. 4B shows a fourth cutting gas nozzle having an outer nozzle in the other end position.

The cutting gas nozzle 1''' shown in FIGS. 4A, 4B differs from the cutting gas nozzle 1' of FIGS. 2A and 2B in that the connection openings 16 are formed as axial oblong holes which interconnect the nozzle bore 15 of the inner nozzle 6 and the annular gap 11 of the outer nozzle 8 in the rearward end position (FIG. 4A) up to the forward end position (FIG. 4B) of the sleeve 10, and in that an annular space 26 which is connected to the environment by way of a guide gap 27 that is provided between the nozzle body 5 and the sleeve 10 remains between the rear end face 21 of the sleeve 10 and the nozzle body 5 in the rearward end position. Due to the connection bores 16 and the annular space 26 that is provided in each sleeve position, by way of a targeted choice of the gas pressure it is possible for the sleeve 10 to be suctioned in the reverse direction 22 from an advanced position up to the rearward end position of the sleeve 10. The rearward end position of the sleeve 10 is defined either by the rear end face of the sleeve bearing on the conical external side of the inner nozzle 6, or by the front sleeve rim 18c bearing on the nozzle body 5.

As opposed to the cutting gas nozzles 1, 1', 1", the sleeve 10 of the cutting gas nozzle 1''' does not have any outwardly pointed or spherical centering bead; rather, the external wall 12 of the annular gap 11, formed by the internal wall of the main body 5a of the nozzle body 5, here tapers conically in the forward direction 20, so as to enable tilting of the sleeve 10 by approximately ±5° within the annular gap 11. Alternatively or additionally, the sleeve wall on the external side can also taper, in particular in a conical manner, in the reverse direction 22.

When the cutting gas flow is switched on, negative pressure is first generated in the annular space 26 of the cutting gas nozzle 1''', or on the rear end face 21 of the sleeve 10, respectively. This negative pressure draws the sleeve 10 into the nozzle body 5 up to the rearward end position, even when the sleeve 10 is not in contact with the workpiece surface. If the gas pressure of the cutting gas remains lower than a limit pressure (for example 3 bar) that is predefined by the weight of the sleeve 10, the sleeve 10 remains in the suctioned state. This state is utilizable for protecting the sleeve 10 from damage or contamination, for example when piercing, when employing the nozzle for engraving or marking the workpiece, or when cleaning the nozzle with brushes. That is to say in methods that operate at a large nozzle spacing from the workpiece 4 the sleeve 10 nevertheless remains in the rearward end position in the nozzle body 5.

If the gas pressure is increased beyond the limit pressure, the cutting gas thus flows through the annular gap 11 between the inner nozzle 6 and the sleeve 10 in an increasingly turbulent manner. The effect of force of the cutting gas that is directed forward is likewise increased such that the valve sleeve 10 is urged in the forward direction 20 by the cutting gas.

This state when cutting the workpiece 4 is adjusted such that the sleeve 10 is in contact with the workpiece surface. This effectively prevents any lateral outflow of the cutting gas and suctioning of ambient air into the cutting gap. In this way, the gas consumption is reduced and a precisely defined gas composition is obtained in the cutting gap, significantly improving the quality of the cut edges obtained.

To suction the sleeve 10 again after the cutting operation, the gas pressure at the entry 15 of the nozzle body 5 first is reduced to almost 0 bar, or completely switched off. Increasing the gas pressure to just below the limit pressure again then has the effect of suctioning the sleeve 10, which by virtue of gravity is located in the forward end position thereof on protrusions 29 of the nozzle body 5, to the rearward end position thereof. In the case of a constant gas pressure at below the limit pressure, the sleeve 10 remains in the rearward end position thereof in the nozzle body 5.

Instead of by way of the guide gap 27 as shown in FIGS. 3A and 4B, air from the environment can also be suctioned by way of a bore (not shown) in the nozzle body 5, the bore connecting the annular space 26 to the environment.

Figure 5:
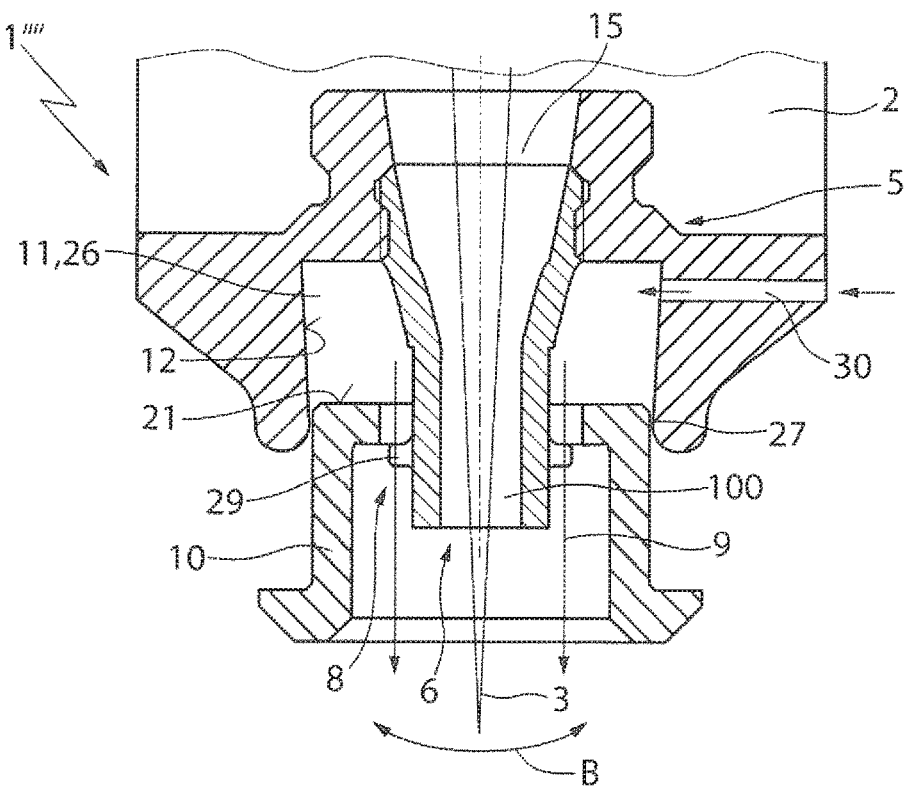
FIG. 5 shows a fifth gas nozzle with an outer nozzle without a core flow.

By contrast to the cutting gas nozzle 1''' of FIGS. 4A and 4B, the gas nozzle 1'''' shown in FIG. 5 has no connection openings between the nozzle bore 15 and the annular gap 11, and only the laser beam 3 exits through the beam exit opening 100 of the internal contour 6 in the direction of the workpiece. Process or inert gas is supplied to the annular space 26 by way of a supply line 30 in the nozzle body 5. The gas then enters the sleeve 10 from the annular space 26 through the nozzle cross-sectional area 25, and exits the sleeve 10 as an annular flow 9. Such a nozzle 1'''' is particularly suitable for welding.

Figure 6A:
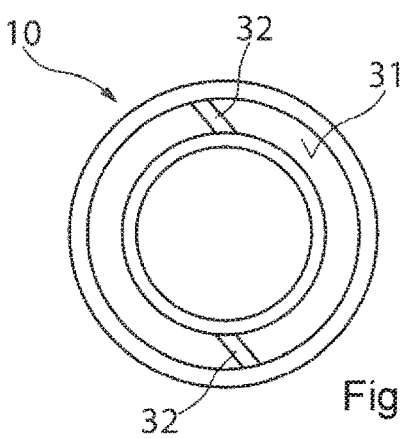
FIG. 6A shows a modification to the sleeves of FIGS. 1A to 5, in a plan view of the front end side of the sleeve.
Figure 6B:
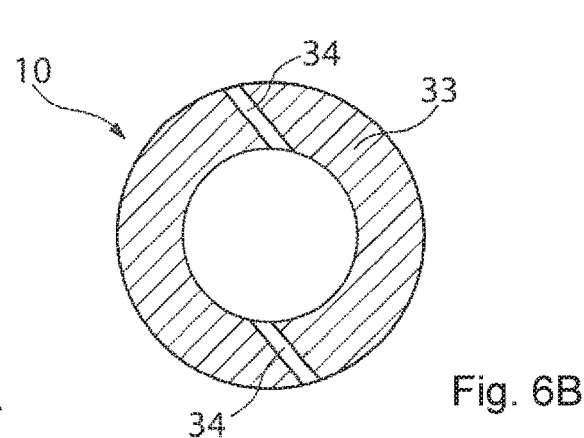
FIGS. 6B, 6D show modifications to the sleeves of FIGS. 1A to 5 in a cross-sectional view.
Figure 6C:
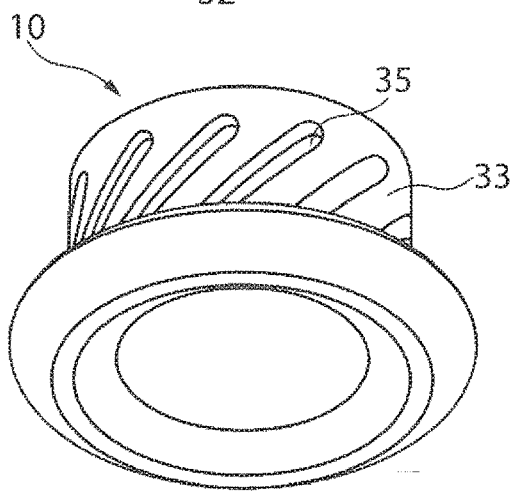
FIG. 6C shows a modification to the sleeves of FIGS. 1A to 5 in a perspective side view.
Figure 6D:
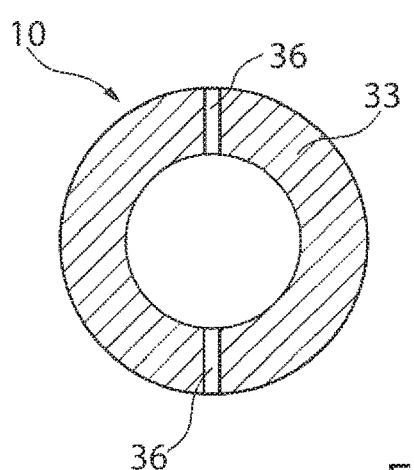

Various modifications to the sleeve 10 are shown in FIGS. 6A to 6D. In FIG. 6A, the front end face 31 of the sleeve 10 has a plurality of grooves 32 that run obliquely to the radial direction or helically, with two grooves illustrated. In FIG. 6B, the cylindrical sleeve wall 33 has a plurality of bores 34 that run obliquely to the radial direction, with two bores illustrated. In both cases the sleeve 10 is thus set in rotation by the cutting gas in the grooves 32 or bores 34 that flows out from the inside to the outside. The grooves 32 can be very narrow and flat such that only a minor fraction of the cutting gas flows out to the environment through the grooves 32. Due to the oblique or helical, respectively, alignment of the grooves 32 and of the bores 34, the momentum of the outflowing cutting gas exerts a torque on the valve sleeve 10 and sets the latter in rotation. Alternatively, a plurality of grooves 35 (FIG. 6C) that run obliquely to the axial direction can also be provided on the external side of the cylindrical sleeve wall 31, such that the valve sleeve 10 is set in rotation by the air 28 or the process or inert gas that flows axially in the guide gap 27. In addition to the rotation-causing structures, the valve sleeve 10 in the cylindrical sleeve wall 31 thereof can have one or more thin bores 36.

The rotation of the sleeve 10 can have several advantages. When the sleeve 10 is made from a highly abrasion-resistant material, such as, for example, oxide ceramics ($Al_2O_3$), the sleeve 10 can to a certain extent remove contaminants from the workpiece surface by way of a momentum transfer due to the front end face 31. For example, for a turning tool or a milling tool. When the sleeve 10 is in mechanical contact with the workpiece surface and is rotating, planar contaminants such as, for example, oil or mill scale layers, paint or adhesive residues, pulverulent traces, metal pearls, or the like, can be removed. However, the ceramics sleeve 10 can leave behind scratch marks on the workpiece surface due to the direct mechanical contact. Moreover, due to the rotation of the sleeve 10, the static friction between the sleeve 10 and the workpiece surface, and the wear of the sleeve 10, are reduced due to localized heating.

If the sleeve 10 has geometric structures such as, for example, grooves 32, on its end face 29 (FIG. 6A) or bores 34, 36 in the sleeve wall 31 (FIGS. 6B and 6D), through which a minor part of the process gas in a locally delimited manner can flow out from the interior of the sleeve 10 into the environment, the rotation of the sleeve 10 thus enables a targeted modulation of the process gas pressure in the processing zone (on the workpiece 4) that is located below the sleeve 10. These pressure variations that are generated in a targeted manner have a positive effect on the quality of the cut edges produced on the workpiece 4, for example when laser cutting.

The sleeve 10 can also be made from plastic instead of ceramics, the plastics not having to be as temperature-resistant as ceramics. The better sliding properties of plastics have the advantage that the formation of scratches on the workpiece surface can be reduced or entirely eliminated in the movement of the sleeve 10 across the workpiece.

A number of embodiments of the invention have been described. Nevertheless, it will be understood that various modifications may be made without departing from the spirit and scope of the invention. Accordingly, other embodiments are within the scope of the following claims.

What is claimed is:

1. A gas nozzle for a laser machining head, the gas nozzle comprising:
   an external nozzle body having a front section, a rear section, and an internal wall extending along an axial length of the external nozzle body and forming a space, wherein the internal wall has a first inner perimeter at the front section and a second inner perimeter at the rear section, the first perimeter being larger than the second perimeter;
   an inner nozzle body disposed within the space and having a rear section that is screw-fitted into the internal wall of the rear section of the external nozzle body, a front section having an external wall with protrusions that extend radially outward, and a bore extending axially through the inner nozzle body for passage of a laser beam and a gas stream therethrough;
   a gap formed within the space between the external wall of the inner nozzle body's front section and the internal wall of the external nozzle body's front section; and
   a sleeve that is axially displaceable within the gap between a forward position and a rearward position, wherein in both the forward and rearward positions, a front end of the sleeve is positioned outside the external nozzle body and a rear end of the sleeve is positioned within the gap, wherein the sleeve's front end has an outer perimeter that is larger than the first inner perimeter of the external nozzle body's front section, the sleeve's rear end having an outer perimeter that fits within the first inner perimeter and having an internal contour shaped as a shoulder that engages with the inner nozzle body's protrusions when the sleeve is in the forward position.

2. The gas nozzle of claim 1, wherein the inner nozzle body includes one or more axial oblong holes extending axially along the inner nozzle body's external wall.

3. The gas nozzle of claim 2, wherein each of the one or more axial oblong holes provides a passage that interconnects the bore of the inner nozzle body with the gap so as to allow gas to flow therethrough.

4. The gas nozzle of claim 2, wherein the protrusions on the inner nozzle body share a same first axial position and extend radially outward from the inner nozzle body's front section.

5. The gas nozzle of claim 4, wherein a first axial oblong hole has a front tip and a rear tip and extends axially along the inner nozzle body so that the front tip is positioned distal of the protrusions and the rear tip is positioned proximal of the protrusions.

6. The gas nozzle of claim 5, wherein when the inner nozzle body's rear section is screwed into the internal wall of the external nozzle body's rear section, a front end of the external nozzle body has the same first axial position as the protrusions on the inner nozzle body.

7. The gas nozzle of claim 6, wherein when the inner nozzle body's rear section is screwed into the internal wall of the external nozzle body's rear section, a front end of the inner nozzle body extends distally beyond the front section of the external nozzle body.

8. The gas nozzle of claim 7, wherein when the inner nozzle body's rear section is screwed into the internal wall of the external nozzle body's rear section, a rear end of the external nozzle body extends proximally beyond the rear section of the inner nozzle body.

9. The gas nozzle of claim 5, wherein the inner nozzle body includes a tapered section between the inner nozzle body's rear section and the inner nozzle body's front section.

10. The gas nozzle of claim 9, wherein each of the one or more axial oblong holes extends axially over a length of the tapered section.

11. The gas nozzle of claim 10, wherein the tapered section tapers from the inner nozzle body's rear section to the inner nozzle body's front section, such that the inner nozzle body's rear section has an outer perimeter that is larger than the outer perimeter of the inner nozzle body's front section.

12. The gas nozzle of claim 11, wherein the bore of the inner nozzle body is defined by an internal wall of the inner nozzle body, said internal wall having a perimeter that is larger at the rear section than at the front section and forms a cylindrical portion of the bore.

13. The gas nozzle of claim 12, wherein the bore is tapered in the tapered section.

14. The gas nozzle of claim 9, wherein at least a portion of the inner nozzle body's front section has constant inner and outer diameters between the tapered section and the protrusions.

15. The gas nozzle of claim 1, wherein the internal wall extending along the axial length of the external nozzle body has a transition section between the front section and the rear section, the transition section of the external nozzle body's internal wall extending radially outward from the second inner perimeter of the external nozzle body's rear section to the first inner perimeter of the external nozzle body's front section.

16. The gas nozzle of claim 1, wherein an external wall of the external nozzle body's rear section is screw-fitted into a laser machining head.

17. The gas nozzle of claim 1, wherein the sleeve's front end includes two slanted surfaces, including a slanted internal surface and a slanted external surface.

18. The gas nozzle of claim 17, wherein a chamfer angle of each of the slanted internal surface and the slanted external surface is between 30° and 60°.

19. The gas nozzle of claim 18, wherein the chamfer angle of each of the slanted internal surface and the slanted external surface is 45°.

20. The gas nozzle of claim 1, wherein the bore includes an exit opening configured to direct the gas flow and the laser beam onto a workpiece when the gas nozzle is in operation.

21. The gas nozzle of claim 20, wherein the directed gas stream is an annular gas flow.

22. The gas nozzle of claim 1, wherein the gap is positioned to receive at least a portion of the gas stream, and the internal wall of the external nozzle body directs the received gas stream onto a workpiece.

23. The gas nozzle of claim 1, configured so that, in operation, axial displacement of the sleeve within the gap varies the flow configuration of the gas stream through the gas nozzle.

24. The gas nozzle of claim 23, wherein displacement of the sleeve to a first sleeve position forms a single-bore nozzle in which gas flows out from only the inner nozzle body, and displacement of the sleeve to a second sleeve position forms a multi-duct nozzle, in which gas flows out from both the inner nozzle body and the gap.

25. The gas nozzle of claim 24, wherein when the sleeve is in the forward position, cutting gas flows out from the bore of the inner nozzle body and not through the gap.

26. The gas nozzle of claim 25, wherein when the sleeve is in the rearward position, cutting gas flows out from both the bore of the inner nozzle body and through the gap.

27. The gas nozzle of claim 23, wherein the axial displacement of the sleeve within the gap allows the gas nozzle to cut, pierce, or mark a workpiece, or weld workpieces having dissimilar thicknesses.

28. The gas nozzle of claim 1, wherein the front end of the sleeve is radially rotatable about a front end of the external nozzle body.

29. The gas nozzle of claim 28, wherein the sleeve is a single piece and includes a cylindrical portion between the front and rear ends of the sleeve.

30. The gas nozzle of claim 29, wherein the sleeve includes one or more grooves on the cylindrical portion that run obliquely in the axial direction and are configured to cause the sleeve to rotate when gas flows axially between the sleeve and the internal wall of the external nozzle body's front section.

* * * * *